United States Patent
von Tardy-Tuch

(10) Patent No.: US 9,327,549 B2
(45) Date of Patent: May 3, 2016

(54) VEHICLE WHEEL RIM

(71) Applicant: Dr. Ing. h.c. F. Porsche Aktiengesellschaft, Stuttgart (DE)

(72) Inventor: Georg von Tardy-Tuch, Kapfenhardt (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 275 days.

(21) Appl. No.: 13/954,293

(22) Filed: Jul. 30, 2013

(65) Prior Publication Data

US 2014/0035348 A1 Feb. 6, 2014

(30) Foreign Application Priority Data

Aug. 1, 2012 (DE) .......................... 10 2012 107 018

(51) Int. Cl.
*B60B 3/08* (2006.01)
*B60B 3/00* (2006.01)
*B60B 3/04* (2006.01)

(52) U.S. Cl.
CPC ................ *B60B 3/001* (2013.01); *B60B 3/044* (2013.01); *B60B 3/087* (2013.01); *B60B 2310/318* (2013.01); *B60B 2360/3416* (2013.01); *B60B 2900/111* (2013.01); *B60B 2900/311* (2013.01)

(58) Field of Classification Search
CPC ............ B60B 3/04; B60B 3/005; B60B 3/08; B60B 3/087; B60B 3/12

USPC ............. 301/63.102, 63.103, 63.107, 63.108, 301/64.301, 64.302
See application file for complete search history.

(56) References Cited

U.S. PATENT DOCUMENTS

| | | | | |
|---|---|---|---|---|
| 3,612,614 | A * | 10/1971 | Ware | 301/43 |
| 3,726,566 | A * | 4/1973 | Beith | 301/37.11 |
| 5,031,966 | A * | 7/1991 | Oakey | 301/37.11 |
| 5,641,208 | A * | 6/1997 | Stach | 301/64.102 |
| 5,951,114 | A * | 9/1999 | Marron et al. | 301/63.101 |
| 6,024,415 | A * | 2/2000 | Stach | 301/64.102 |
| 6,068,350 | A * | 5/2000 | Baumgarten et al. | 301/64.102 |
| 7,018,000 | B2 * | 3/2006 | Alff et al. | 301/63.107 |
| 7,464,995 | B2 * | 12/2008 | Csapo et al. | 301/63.107 |
| 8,454,100 | B2 * | 6/2013 | Kihara et al. | 301/64.101 |
| 8,882,206 | B2 * | 11/2014 | Nakayama et al. | 301/63.107 |
| 2003/0141754 | A1* | 7/2003 | Guimard et al. | 301/64.307 |
| 2010/0213756 | A1* | 8/2010 | Kozaki et al. | 301/63.107 |
| 2014/0035348 | A1* | 2/2014 | von Tardy-Tuch | 301/63.102 |
| 2015/0001913 | A1* | 1/2015 | Abe et al. | 301/63.101 |
| 2015/0210109 | A1* | 7/2015 | Von Tardy-Tuch et al. | 301/63.107 |

FOREIGN PATENT DOCUMENTS

DE 10243467 4/2004

* cited by examiner

*Primary Examiner* — Jeffrey J Restifo
(74) *Attorney, Agent, or Firm* — RatnerPrestia

(57) ABSTRACT

A vehicle wheel rim (1) having a wheel rim well (2) and having a wheel disk (16, 25, 37), wherein the wheel rim well (2) has a substantially axially extending region (3) and the wheel disk (16, 25, 37) has a substantially axially extending region (8, 9), wherein the wheel disk (16, 25, 37) and the wheel rim well (2) are connected to one another in the axially extending regions (3, 8, 9).

11 Claims, 1 Drawing Sheet

VEHICLE WHEEL RIM

CROSS-REFERENCE TO RELATED APPLICATIONS

This application claims priority of German Patent Application No. 10 2012 107 018.0, filed Aug. 1, 2012, which is incorporated by reference herein in its entirety.

FIELD OF INVENTION

The invention relates to a vehicle wheel rim having a wheel rim well and a wheel disk, wherein the wheel rim well has a substantially axially extending region and the wheel disk has a substantially axially extending region.

Contact between motor vehicles and the ground is nowadays generally established via vehicle wheels. Said wheels are composed of a wheel rim and of a tire mounted on the wheel rim. The wheel rim is generally composed of a wheel disk which is connected to a wheel rim well.

BACKGROUND

The wheels are among the unsprung masses of the vehicle. To make sporty driving characteristics possible, by way of good steering characteristics or high acceleration, for example, and to also increase the comfort of the vehicle, it is advantageous to keep the unsprung mass on the vehicle as low as possible.

For this purpose, in particular in sports cars, wheel rims are used which, through particularly sparing use of material, or through the use of particularly lightweight materials, have a low overall weight. Despite the desired weight reduction, it is necessary to ensure adequate strength of the wheel rim.

Wheel rims composed of aluminum or magnesium are known from the prior art. Furthermore, wheel rims are produced from fiber composite materials such as for example CFRP (carbon-fiber-reinforced plastic).

Here, CFRP wheel rims in particular must be designed such that they can withstand the forces that occur during operation and so as to exhibit adequately high resistance to the occurrence of defects.

In the present prior art, the transition from the wheel disk or the spoke region into the wheel rim well is a location regarded as being critical.

SUMMARY

It is therefore the object of the present invention to provide a vehicle wheel rim which, in particular in the region of the connecting point between wheel disk and wheel rim well, exhibits a solution appropriate to the material.

The object of the present invention is achieved by means of a vehicle wheel rim having the features of claim 1.

An exemplary embodiment of the invention relates to a vehicle wheel rim having a wheel rim well and a wheel disk, wherein the wheel rim well has a substantially axially extending region and the wheel disk has a substantially axially extending region, wherein the wheel disk and the wheel rim well are connected to one another in the axially extending regions (3, 8, 9).

By means of a connection of the wheel disk and of the wheel rim well in a substantially axially extending region, it is possible for forces, such as in particular shear forces, to be accommodated in a particularly advantageous manner even across the connecting point. The formation of a substantially axially extending region in each case in the wheel rim well and in the wheel disk results, depending on the axial length of the regions, in a large overlap area, whereby a particularly high level of strength can be attained within the connecting point. Here, the axial regions are advantageously formed as annularly encircling regions.

In a further preferred embodiment, it is advantageous for the wheel disk to form a conical receiving region. Said receiving region may advantageously serve for receiving a wheel hub.

The conical receptacle formed by the wheel disk serves in particular for receiving a wheel hub. Here, the conical shape is particularly advantageous because the conical shape generates a centering action during the mounting of the wheel rim. This facilitates the process of the mounting of the wheel rim on the vehicle.

It is also expedient for the wheel disk to be formed from a first shell element and a second shell element. Said shell elements may advantageously form a cavity situated between the shell elements.

In one advantageous refinement, it may be provided that the wheel disk is formed by three shell elements. Here, it may also be expedient for the third shell element to be arranged as a link between the first shell element and the second shell element. Here, the link may connect the two other shell elements to one another radially at the inside, in particular in the region of the conical receiving region.

As a result of the construction of the wheel disk from multiple shell elements, it is possible for a wheel disk to be generated which is characterized by a particularly low material usage and thus by a particularly low overall weight. Here, depending on the configuration, it is expedient for the wheel disk to be formed from two or three shell elements.

The use of carbon-fiber-reinforced plastics in particular places particularly high demands on the configuration of the individual elements, for example because mechanical joining processes such as those used with metal components cannot be used or can be used only to a limited extent. Furthermore, cutting machining, for example, of carbon-fiber-reinforced plastics is possible only with high outlay.

It may furthermore be advantageous for the shell elements to be connected to one another in such a way that they at least partially overlap.

An overlap between the individual shell elements advantageously results in each case in a connecting surface at which the shell elements can be connected to one another to form the finished wheel disk. Aside from the generation of a suitable connecting surface, it is also possible for a form fit to be generated between the shell elements by means of the overlap, which has an advantageous effect on the strength of the wheel disk.

It is furthermore preferable for the wheel disk to be generated by adhesive bonding or joint consolidation of the shell elements with one another.

Adhesive bonding of the components to one another is particularly advantageous because an adhesive bond does not result in a mechanical impairment of the material, such as occurs for example in the case of rivet connections or screw connections. The wheel disk is thus not influenced in terms of its structural integrity by damaging notch effects which arise from the formation of bores.

In one particularly preferred refinement, it is provided that the wheel rim well and the wheel disk are connected to one another in such a way that the connecting point is of two-layer and/or three-layer and/or multi-layer form.

By means of a multi-layer configuration of the connecting point, the strength of the connecting point and thus the rigidity of the wheel rim as a whole can be increased. In this way, the wheel rim can be subjected to greater load without the connection being deformed or damaged.

It is also advantageous for the wheel disk to have an opening in a region situated adjacent to the connecting point.

An opening in the wheel disk is advantageous because such an opening is required for the cooling of the brakes on the vehicle.

In a further particularly expedient refinement of the invention, it is also provided that the wheel disk is connected to the wheel rim well by adhesive bonding.

Like the connection of the shell elements of the wheel disk, the connection of the wheel disk to the wheel rim well is also advantageously generated by adhesive bonding, because in this way, the adverse influence of notch effects that can arise through the use of rivet connections or screw connections can be avoided.

It is furthermore expedient for the wheel rim well to be engaged behind by the wheel disk at a region adjacent to the connecting point.

By means of such an engaging-behind configuration, it is possible, in addition to the adhesive bonding, to also generate a form fit between the wheel rim well and the wheel disk, which further increases the rigidity of the wheel rim.

Furthermore, it is also preferable for the wheel disk and/or the wheel rim well to be produced from a carbon-fiber-reinforced plastic (CFRP).

The use of a carbon-fiber-reinforced plastic makes it possible to produce a particularly lightweight wheel rim. A lightweight wheel rim reduces the unsprung masses of a vehicle and thus contributes to improved dynamics of the vehicle. This is advantageous in particular in the case of sports cars.

Advantageous refinements are described in the subclaims and in the following description of the figures.

BRIEF DESCRIPTION OF THE DRAWINGS

The invention will be explained in detail below on the basis of exemplary embodiments and with reference to drawings, in which.

DETAILED DESCRIPTION

Figure 1:
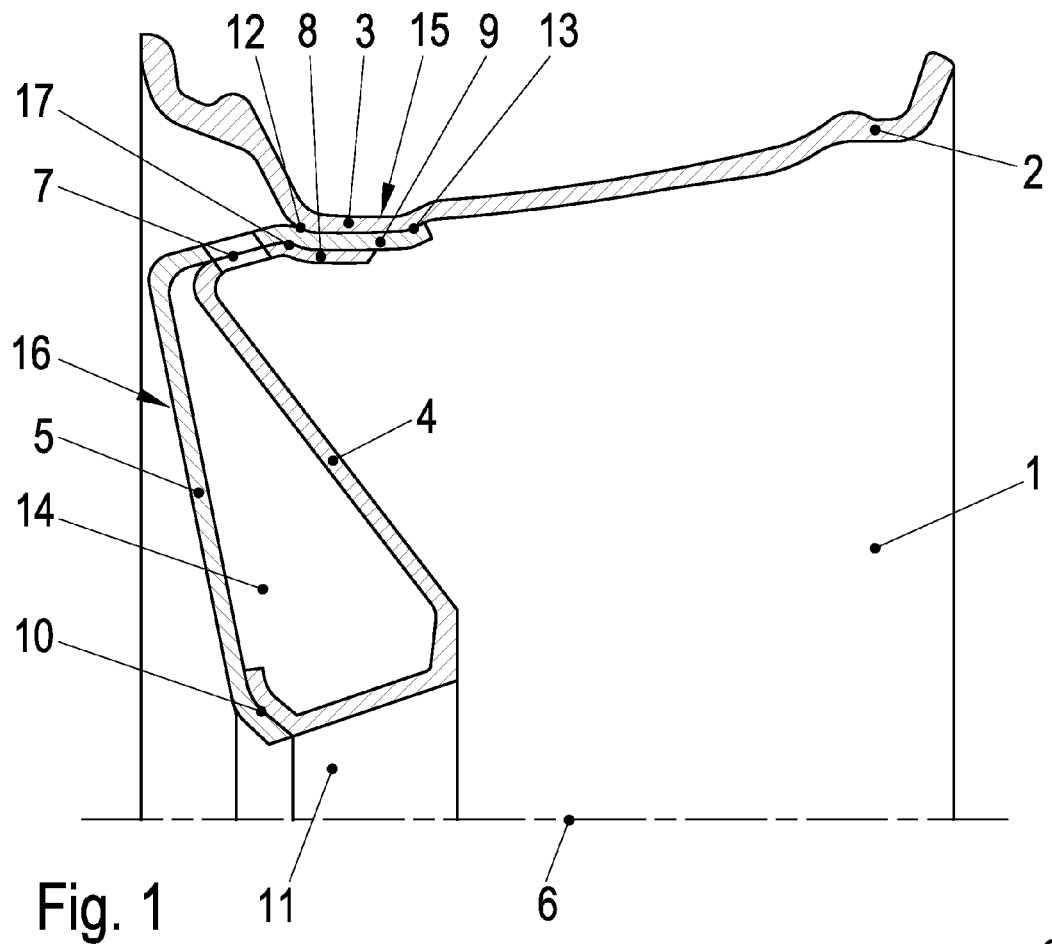
FIG. 1 shows a view of a section through a wheel rim along the central plane, the wheel rim having a wheel rim well and having a wheel disk.

FIG. 1 shows a section along the central plane of a wheel rim 1. Here, only the upper half of the wheel rim 1 is illustrated, because said wheel rim is axially symmetrical with respect to the central axis 6. The wheel rim 1 is composed of a wheel rim well 2 and of a wheel disk 16. The wheel disk 16 is connected to the wheel rim well 2, whereby the wheel rim 1 is formed.

The wheel rim well 2 has an axially extending region 3 which is arranged in the left-hand third of the wheel rim well 2.

The wheel rim well 2 shown in FIG. 1 is oriented such that the left-hand region constitutes that side of the wheel rim 1 which faces away from a vehicle, and the right-hand region constitutes that side of the wheel rim 1 which faces toward a vehicle.

Proceeding from the axially extending region 3 of the wheel rim well 2, the profile of the wheel rim well 2 adjoining to the left and to the right rises proceeding from the axial region 3. In the exemplary embodiment of the wheel rim well 2 shown in FIG. 1, the axially extending region 3 thus forms the lowest point of the wheel rim well 2.

In the exemplary embodiment shown in FIG. 1, the wheel disk 16 is formed from a first shell element 4 and from a second shell element 5. Said two shell elements 4, 5 are positioned relative to one another such that they form an overlap region 10 at which they are connected to one another in their lower region. Furthermore, the shell element 4 and the shell element 5 overlap in the upper region facing toward the wheel rim well 2, where said shell elements are likewise connected to one another.

Both the wheel rim well 2 and also the shell elements 4, 5 are axially symmetrical with respect to the central axis 6 of the wheel rim 1.

The shell element 4 has an axially extending region 8, and the shell element 5 has an axially extending region 9. The two shell elements 4, 5 are connected to one another along the axial regions 8, 9.

Furthermore, at the point 17, the shell element 5 is engaged behind by the shell element 4, whereby, in addition to the connection in the axial region 8, 9, a form fit is generated which further increases the stability of the connection of the shell elements 4, 5.

In one advantageous embodiment, the shell elements 4, 5 are adhesively bonded to one another so as to form the wheel disk 16. For this purpose, the shell elements 4, 5 are adhesively bonded to one another in the region of their overlap 10 and also in the region of the axial extent 8, 9. By means of the adhesive bonding, notch effects that can arise as a result of alternative connecting methods, such as for example screw connections or rivet connections, are avoided. This increases the strength of the wheel disk 16.

The shell elements 4, 5 are designed such that a cavity 14 is formed between them. Here, the shell element 5 is composed substantially of two limbs which are oriented at an angle of approximately 90° with respect to one another. Here, the first limb has an opening 7 and, adjoining the latter, from the starting point of the two limbs, the substantially axial region 9 which runs at an angle with respect to the first portion of the limb. In front of and behind the axial region 9, the first limb has rising walls, whereby a slightly U-shaped region is formed around the axial region 9. The first limb runs substantially in the direction of the central axis 6 of the wheel rim 1.

The second limb is longer than the first limb and runs substantially in a direction from the wheel rim well 2 toward the central axis 6. The second limb has, at its end region, an angled partial region which, in the assembled state, forms the overlap region 10 with the shell element 4 and which is oriented in the direction of the center of the wheel rim well 2.

The shell element 4 substantially forms a Z shape. Here, the upper limb runs substantially in the direction of the central axis 6. Said upper limb has an opening 7 and, adjoining the latter as viewed from the joint point of the upper and middle limbs, the axial region 8. Said axial region 8 runs at an angle with respect to the rest of the upper limb. Proceeding from the axial region 8, the wall which forms the limb rises toward the joint point of the upper and middle limbs.

The middle limb of the shell element 4 runs substantially in a direction from the wheel rim well 2 toward the central axis 6. The end region of the middle limb has an angled partial region which is adjoined by the lower limb of the shell element 4.

The lower limb of the shell element 4 runs substantially parallel to the upper limb of the shell element 4. At its end, the lower limb has an upwardly angled partial region. In the fully assembled state, said upwardly angled partial region is situated opposite the angled partial region of the second limb of the shell element 5, and together therewith, forms the overlap region 10 of the two shell elements 4, 5.

In alternative embodiments, the shell elements 4, 5 may also be of a configuration differing from the design shown here. Here, the construction shown in FIG. 1 constitutes merely one preferred exemplary embodiment, and does not rule out other configurations.

The wheel rim 1 according to the invention is characterized in particular by a low weight. This is achieved through the selection of an expedient material, such as, in the case of FIG. 1, a carbon-fiber-reinforced plastic (CFRP).

Furthermore, the wall thicknesses of the elements, such as for example the wheel rim well 2 or the wheel disk 16, are as far as possible kept to a minimum. For this purpose, in particular, the components are dimensioned such that they can withstand the forces and loads that occur subsequently during operation. Since in particular the connecting point 15 at which the wheel rim well 2 is connected to the wheel disk 16 is subjected to high shear forces, it is advantageous to provide a particularly stable construction of the wheel rim 1 here.

The wheel disk 16 is connected, along the axially extending region 9 of the shell element 5, to the axially extending region 3 of the wheel rim well 2. The connection between the wheel disk 16 and the wheel rim well 2 is likewise generated by adhesive bonding. The axial regions 3, 8, 9 generate a planar connecting surface which provides good contact between the wheel disk 16, composed of the two shell elements 4, 5, and the wheel rim well 2.

The connection of the wheel disk 16 to the wheel rim well 2 generates a doubling or tripling of the material at the connecting point 15. Along the axially extending region 3 of the wheel rim well 2, a doubling of material is realized by the shell element 5 and, more precisely, the axially extending region 9 thereof. Additionally, a tripling of material is realized, in partial regions of the axially extending region 3, by the shell element 4 which adjoins the shell element 5 in the downward direction.

Said doubling or tripling of material further increases the rigidity of the wheel rim 1.

In addition to the adhesive bonding between the wheel disk 16 and the wheel rim well 2, two engage-behind points 12, 13 are realized by the shell element 5 which generate an additional form fit between the wheel disk 16 and the wheel rim well 2. This additionally increases the rigidity of the wheel rim 1 as a whole and, in particular in the region of the connecting point 15, contributes to the possibility of greater forces and torques being transmitted.

To the left of the connecting point 15, the wheel disk 16 has an opening 7. Said opening 7 runs both through the shell element 4 and also through the shell element 5. The opening 7, which is shown in section in FIG. 1, is merely one of a multiplicity of openings 7. Here, the openings 7 are arranged in a radially encircling manner on the circumference of the wheel disk 16. Said openings may be arranged either at regular or irregular intervals.

At its end remote from the wheel rim well 2, the wheel disk 16 forms a conical region which widens from left to right. Said region constitutes a hub region 11. For mounting on a vehicle, the wheel rim 1 is thus pushed with the hub region 11 over the wheel hub of a vehicle and fixedly connected to the wheel hub for example by means of a screw element.

By means of the construction of the wheel rim 1 according to the invention as shown in FIG. 1, a wheel rim 1 is generated which is characterized by a particularly low weight and, at the same time, particularly high rigidity. In addition to the use of adhesive bonds, it is provided in particular that the wheel disk 16 is also fixed with respect to the wheel rim well 2 by means of mechanical engage-behind points 12, 13, such that the connection between the wheel disk 16 and the wheel rim well 2 is particularly stable and can thus transmit high forces and torques.

In alternative embodiments, the wheel disk 16 may also be formed by shell elements which differ in terms of their shape from the shell elements 4, 5 shown here. Alternative exemplary embodiments are illustrated in FIGS. 2 and 3.

Figures 2, 3:
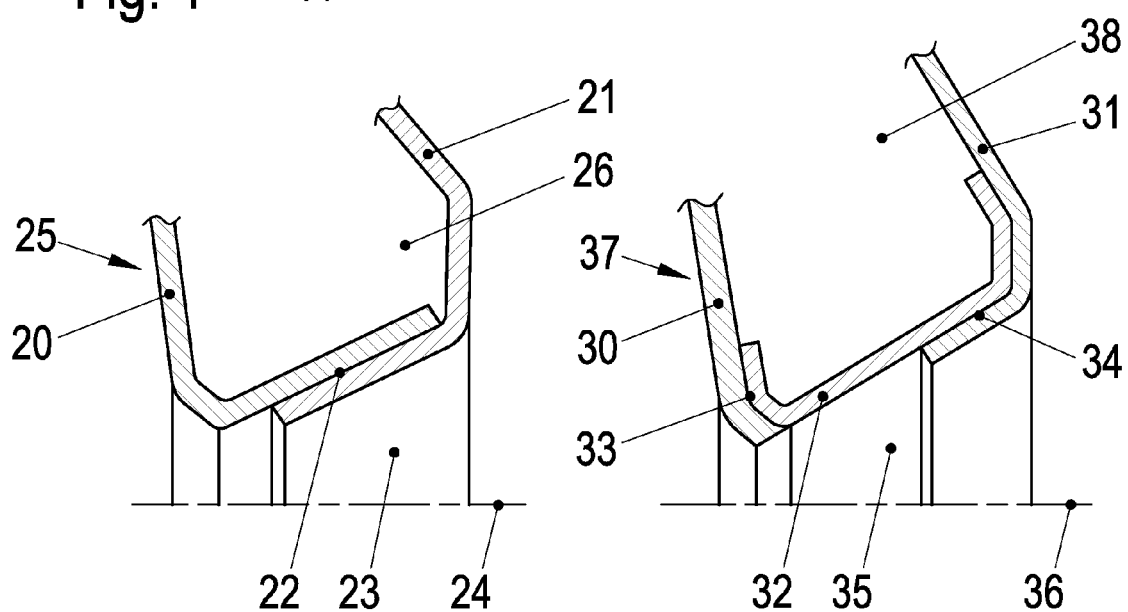
FIG. 2 shows a detail view of an alternative configuration of the wheel disk in the region of the wheel hub receptacle.
FIG. 3 shows a further alternative configuration of the wheel disk in the region of the wheel hub receptacle.

FIG. 2 shows an alternative configuration of the connecting point 22 of the two shell elements 20, 21, which form an alternative wheel disk 25. By contrast to FIG. 1, the left-hand shell element 20, which in FIG. 1 is the shell element 5, is now designed such that the overlap region between the shell element 20 and the right-hand shell element 21 is arranged along one of the side surfaces of the hub region 23.

The left-hand shell element 20 corresponds in terms of its basic design to that of the shell element 5 of FIG. 1. By contrast thereto, the shell element 20 now has a third limb which adjoins the angled end region of the second limb.

Said third limb runs substantially rectilinearly in the direction of the central axis 24. By contrast to the shell element 4, the shell element 21 in this case has no angled end region on its lower limb, but rather, like the third limb of the shell element 20, runs substantially rectilinearly in the direction of the central axis 24.

The third limb of the shell element 20 and the lower limb of the shell element 21 together form the connecting point 22 by overlapping one another.

Here, the left-hand shell element 20 is situated above the shell element 21. The overlap takes place in a planar region which forms the side wall of the hub region 23. The two shell elements 20, 21 are also adhesively bonded to one another in FIG. 2. As a result of the configuration of the shell elements 20, 21, it is however the case in FIG. 2 that only the adhesive bond acts as a connection between the two shell elements 20, 21 at the connecting point 22. Owing to the shaping, there is no form fit between the shell elements 20, 21.

In an alternative embodiment, the shell element 20 may also be provided as an outer wall of the hub region 23.

As is also the case in FIG. 1, the elements of FIG. 2 are arranged axially symmetrically about a central axis 24. The connecting point 22 which is generated by a material overlap between the shell element 20 and the shell element 21 thus forms, as a result of the axis-symmetry with respect to the central axis 24, the outer wall of the hub region 23.

The shell elements 20, 21 form a cavity 26 which forms the interior of the wheel disk 25.

FIG. 3 shows a further alternative embodiment of a wheel disk 37. By contrast to FIGS. 1 and 2, the wheel disk 37 is now formed from three shell elements 30, 31, 32.

The shell element 30, which in the figure is arranged on the left, corresponds substantially to the shell element 5 shown in FIG. 1. The right-hand shell element 31 corresponds substantially to the shell element 21 shown in FIG. 2, with the difference that the lower, planar extent is considerably shorter than that of the shell element 21.

The left-hand shell element 30 is connected to the right-hand shell element 31 via a further shell element 32. Said third shell element 32 is formed in the manner of a link and forms a connecting point 33 with the left-hand shell element 30 and a connecting point 34 with the right-hand shell element 31.

The shell elements 30, 31, 32 are likewise adhesively bonded to one another.

Here, the link-like shell element 32 is shaped so as to correspond to the outer contours of the end regions of the shell elements 30 and 31. This applies in particular to the connecting points 33 and 34. Between the connecting points 33, 34, the link-like shell element 32 is of rectilinear form and runs substantially in the direction of the central axis 36.

In addition to the adhesive bond, a form fit is formed between the shell element 32 and the two other shell elements 30, 31 owing to the shaping, which form fit fixes the shell element 32 in the position shown in FIG. 3. The lower, planar region of the shell element 31 and that planar region of the shell element 32 which faces toward the central axis 36 form, in FIG. 3, the wall of the hub region 35.

The shell elements 30, 31 and 32 form a cavity 38 which forms the interior of the wheel disk 37.

The connections of the wheel disk 25 from FIGS. 2 and 37 from FIG. 3 to the wheel rim well 2 are analogous to the connection of the wheel disk 16 from FIG. 1. Only the design of the wheel disks 25, 37 deviates from FIG. 1.

The components shown in FIG. 3 are axially symmetrical with respect to the central axis 36.

In alternative embodiments, the configuration of the shell elements 4, 5, 20, 21, 30, 31, 32 may also differ from the embodiments shown in FIGS. 1 to 3. What is essential is that the connection between the wheel disk 16, 25, 37 and the wheel rim well 2 follows the principle shown in FIG. 1.

What is claimed:

1. A vehicle wheel rim (1) having a wheel rim well (2) and having a wheel disk (16, 25, 37) comprising a first shell element (4, 5, 20, 21) and a second shell element (4, 5, 20, 21), wherein the wheel rim well (2) has a substantially axially extending region (3) and the first and second shell elements (4, 5, 20, 21) of the wheel disk (16, 25, 37) each have a substantially axially extending region (8, 9), wherein the wheel disk (16, 25, 37) and the wheel rim well (2) are connected to one another in the axially extending regions (3, 8, 9), and wherein the axially extending regions (3, 8, 9) generate a planar connecting surface between the wheel disk (16) and the wheel rim well (2).

2. The vehicle wheel rim as claimed in claim 1, wherein a cavity (14, 26) is formed between the shell elements (4, 5, 20, 21).

3. The vehicle wheel rim (1) as claimed in claim 2, wherein the shell elements (4, 5, 20, 21, 30, 31, 32) are connected to one another in such a way that they overlap (10, 15, 22, 33, 34) at least in regions.

4. The vehicle wheel rim (1) as claimed in claim 2, wherein the shell elements (4, 5, 20, 21, 30, 31, 32) are connected to one another by adhesive bonding.

5. The vehicle wheel rim (1) as claimed in claim 1, wherein the wheel disk (16, 25, 37) is formed by three shell elements (30, 31, 32), wherein the third shell element (32) is arranged as a link between the first shell element (30, 31) and the second shell element (31, 30).

6. The vehicle wheel rim (1) as claimed in claim 5, wherein the third shell element connects the first and the second shell elements radially at the inside, in particular in the region of the conical hub region (35).

7. The vehicle wheel rim (1) as claimed in claim 1, wherein the wheel rim well (2) and the wheel disk (16, 25, 37) are connected to one another in such a way that the connecting point (15) is of two-layer and/or three-layer and/or multi-layer form.

8. The vehicle wheel rim (1) as claimed in claim 1, wherein the wheel disk (16, 25, 37) has an opening (7) in a region situated adjacent to the connecting point (15).

9. The vehicle wheel rim (1) as claimed in claim 1, wherein the wheel disk (16, 25, 37) is connected to the wheel rim well (2) by adhesive bonding.

10. The vehicle wheel rim (1) as claimed in claim 1, wherein the wheel rim well (2) is engaged behind by the wheel disk (16, 25, 37) at a region (12, 13) adjacent to the connecting point (15).

11. The vehicle wheel rim (1) as claimed in claim 1, wherein the wheel disk (16, 25, 37) and/or the wheel rim well (2) are produced from a carbon-fiber-reinforced plastic (CFRP).

* * * * *